US011235619B2

(12) United States Patent
Tsuji

(10) Patent No.: US 11,235,619 B2
(45) Date of Patent: Feb. 1, 2022

(54) NON-PNEUMATIC TIRE

(71) Applicant: TOYO TIRE & RUBBER CO., LTD., Itami (JP)

(72) Inventor: Noriyuki Tsuji, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 375 days.

(21) Appl. No.: 16/207,865

(22) Filed: Dec. 3, 2018

(65) Prior Publication Data
US 2019/0184748 A1 Jun. 20, 2019

(30) Foreign Application Priority Data

Dec. 14, 2017 (JP) .............................. JP2017-239390

(51) Int. Cl.
*B60C 7/10* (2006.01)
*B60C 7/14* (2006.01)

(52) U.S. Cl.
CPC .................. *B60C 7/10* (2013.01); *B60C 7/14* (2013.01)

(58) Field of Classification Search
CPC ............. B60C 7/10; B60C 7/14; B60C 7/143; B60C 7/18; B60C 2007/107; B60C 2007/146;
(Continued)

(56) References Cited

U.S. PATENT DOCUMENTS 3,018,809 A * 1/1962 Bernard ................ B60C 15/028
152/41
5,353,853 A * 10/1994 Hansson ................... B60B 9/00
152/11
(Continued)

FOREIGN PATENT DOCUMENTS

JP 2014-80164 A 5/2014
JP 2015039987 A * 3/2015 ............... B60B 9/04
(Continued)

OTHER PUBLICATIONS

Office Action dated Jul. 9, 2020, issued in counterpart CN Application No. 201811422821.9, with English Translation. (16 pages).
(Continued)

*Primary Examiner* — S. Joseph Morano
*Assistant Examiner* — Emily G Castonguay
(74) *Attorney, Agent, or Firm* — Westerman, Hattori, Daniels & Adrian, LLP

(57) ABSTRACT

A non-pneumatic tire includes: an inner annular portion; an outer annular portion; and a plurality of connecting portions connecting the inner and outer annular portions to each other. The first and second connecting portions are arrayed along a tire circumferential direction. The first and second connecting portions have a plate thickness smaller than a plate width and have a plate thickness direction oriented to the tire circumferential direction. When S is a length in the tire width direction and H is a height in a tire radial direction in the first and second connecting portions, an inclination angle K of a centerline of each plate width w of the first and second connecting portions to the tire width direction in intersecting portions of the first and second connecting portions when viewed from the tire circumferential direction satisfies a relationship of $30\times(H/S)^{0.7} \leq K \leq 75\times(H/S)^{0.7}$.

3 Claims, 6 Drawing Sheets

(58) Field of Classification Search
CPC ........... B60C 7/107; B60C 7/146; B60B 9/02; B60B 9/04; B60B 9/10; B60B 9/26
See application file for complete search history.

(56) References Cited

U.S. PATENT DOCUMENTS

| | | | |
|---|---|---|---|
| 8,631,844 B2 * | 1/2014 | Anderfaas | B60B 9/26 152/69 |
| 8,757,228 B2 * | 6/2014 | Dutton | B60B 9/04 152/10 |
| 8,783,310 B2 * | 7/2014 | Abe | B60C 7/18 152/84 |
| 2015/0283851 A1 * | 10/2015 | Abe | B60C 7/14 152/80 |
| 2019/0061428 A1 * | 2/2019 | Iwamura | B60C 7/18 |

FOREIGN PATENT DOCUMENTS

| | | | | |
|---|---|---|---|---|
| JP | 2015-101210 A | 6/2015 | | |
| WO | WO-2017061405 A1 * | 4/2017 | ............... | B60B 9/04 |

OTHER PUBLICATIONS

Office Action dated Aug. 27, 2021, issued in counterpart JP Application No. 2017-239390, with English translation. (8 pages).

* cited by examiner

NON-PNEUMATIC TIRE

BACKGROUND OF THE INVENTION

Field of the Invention

The present invention relates to a non-pneumatic tire provided with, as a tire structural member, a support structure for supporting a load from a vehicle. Preferably, the present invention relates to a non-pneumatic tire usable as a substitute for a pneumatic tire.

Description of the Related Art

As conventional non-pneumatic tires, for example, there are a solid tire, a spring tire, a cushion tire, and the like. These non-pneumatic tires do not have excellent performance of a pneumatic tire.

Patent Document 1 describes a non-pneumatic tire including: an inner annular portion; an outer annular portion provided concentrically on an outer side of the inner annular portion; and a plurality of connecting portions which connect the inner annular portion and the outer annular portion to each other and are provided independently of one another in a tire circumferential direction. In Patent Document 1, the plurality of connecting portions is composed in such a manner that first connecting portions and second connecting portions are arrayed along the tire circumferential direction. The first connecting portions are extended from one side in a tire width direction of the inner annular portion to other side in a tire width direction of the outer annular portion. The second connection portions are extended from other side in the tire width direction of the inner annular portion to one side in the tire width direction of the outer annular portion. In this way, durability of the non-pneumatic tire is enhanced, and dispersion of a ground contact pressure thereof during the tire rolling reduced.

However, in performance of a non-pneumatic tire, it is difficult to improve both of durability and riding comfort. Even in the non-pneumatic tire in Patent Document 1, both of the durability and the riding comfort are not improved sufficiently.

PRIOR ART DOCUMENT

Patent Document

Patent Document 1: JP-A-2014-80164

SUMMARY OF THE INVENTION

Accordingly, it is an object of the present invention to provide a non-pneumatic tire capable of improving both of the durability and the riding comfort.

The above object can be achieved by the present invention as described below.

More specifically, a non-pneumatic tire according to the present invention is a non-pneumatic tire including a support structure for supporting a load from a vehicle, wherein the support structure includes an inner annular portion, an outer annular portion concentrically provided on an outer side of the inner annular portion, and a plurality of connecting portions which connect the inner annular portion and the outer annular portion to each other and are provided in a tire circumferential direction independently of one another, the plurality of connecting portions is configured such that elongated plate-like first connecting portions and elongated plate-like second connecting portions are arrayed along the tire circumferential direction, the first connecting portions being extended from one side in a tire width direction of the inner annular portion to another side in a tire width direction of the outer annular portion, and the second connecting portions being extended from another side in the tire width direction of the inner annular portion to one side in the tire width direction of the outer annular portion, in each of the first connecting portions and the second connecting portions, a plate thickness is smaller than a plate width, and a plate thickness direction is oriented to the tire circumferential direction, and when S is defined to be a length in the tire width direction and H is defined to foe a height in a tire radial direction in each of the first connecting portions and the second connecting portions, an inclination angle K of a centerline of a plate width of each of the first connecting portions and the second connecting portions with respect to the tire width direction in an intersecting portion of each of the first connecting portions and each of the second connecting portions when viewed from the tire circumferential direction satisfies a relationship of a following Expression (1):

$$30 \times (H/S)^{0.7} \leq K \leq 75 \times (H/S)^{0.7} \quad (1)$$

In the present invention, an intersection of the centerlines of the plate widths of the first connecting portion and the second connecting portion in the intersecting portion may be located at a position in a range of 30 to 70% of the height H in the tire radial direction from an inner circumferential surface of the outer annular portion toward an inside in the tire radial direction.

In the present invention, at least either one of the first connecting portion and the second connecting portion when viewed from the tire circumferential direction may include a bent portion in which an inclination angle of the centerline of the plate width with respect to the tire width direction changes, and an angle change of the inclination angle at the bent portion is 45° or less.

In the present invention, at least either one of the first connecting portion and the second connecting portion when viewed from the tire circumferential direction may include a first bent portion and a second bent portion in each of which an inclination angle of the centerline of the plate width with respect to the tire width direction changes, and a difference between an angle change of the inclination angle in the first bent portion and an angle change of the inclination angle in the second bent portion is 30° or less.

A non-pneumatic tire according to the present invention includes: an inner annular portion; an outer annular portion concentrically provided on an outer side of the inner annular portion; and a plurality of connecting portions connecting the inner annular portion and the outer annular portion to each other. The plurality of connecting portions are configured such that a plurality of first-connecting portions and a plurality of second connecting portions are arrayed in a tire circumferential direction. The first connecting portions are extended from one side in a tire width direction of the inner annular portion to other side in a tire width direction of the outer annular portion, and the second connecting portions are extended from other side in the tire width direction of the inner annular portion to one side in the tire width direction of the outer annular portion. The first connecting portions and the second connecting portions have an elongated plate shape in which a plate thickness is smaller than a plate width, and a plate thickness direction is oriented to the tire circumferential direction.

As a result of diligent study, the inventor of the present invention has found out that H/S determined by the length S in the tire width direction and the height H in the tire radial direction in the first connecting portions and the second connecting portions and by the inclination angle K of the centerline of the plate width of each of the first connecting portions and the second connecting portions with respect to the tire width direction in the intersecting portion of each of the first connecting portions and each of the second connecting portions when viewed from the tire circumferential direction are appropriately adjusted, thus making it possible to improve both of the durability and the riding comfort. The present invention has been made on the basis of such knowledge. H/S and K satisfy the relationship of Expression (1), thus making it possible to improve both of the durability and the riding comfort.

DETAILED DESCRIPTION OF THE PREFERRED EMBODIMENTS

Figure 1:
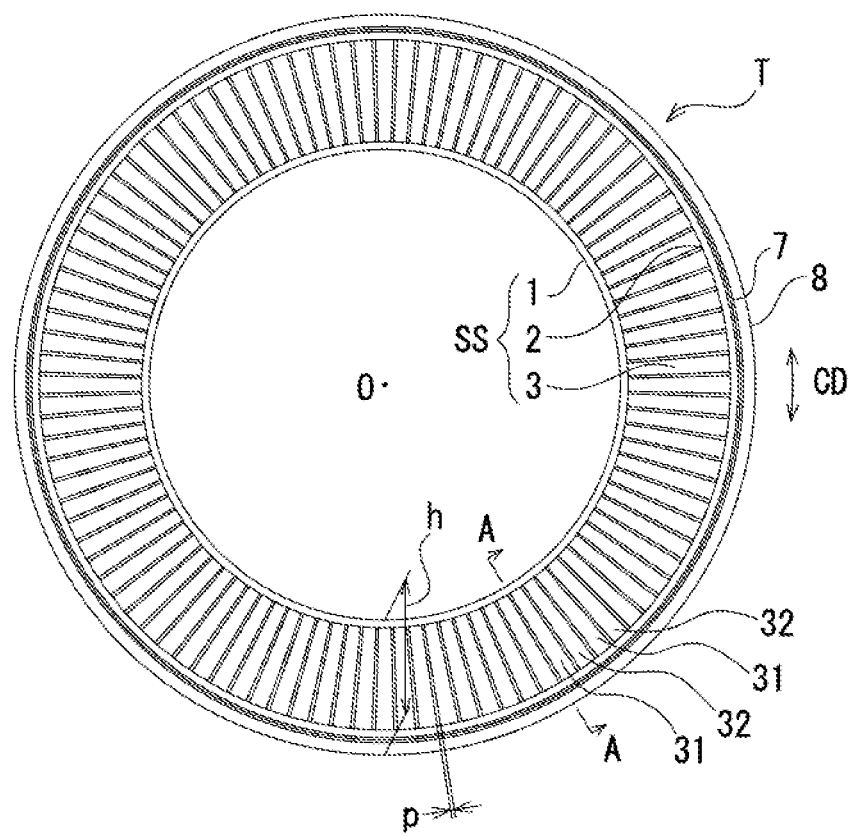
FIG. 1 is a front view showing an example of a non-pneumatic tire of the present invention.

Hereinafter, embodiments of the present invention will be described with reference to the drawings. First, a configuration of a non-pneumatic tire T of the present invention will be described. FIG. 1 is a front view showing an example of the non-pneumatic tire T. FIG. 2A is a cross-sectional view taken along a line A-A of FIG. 1, and FIG. 2B is a perspective view showing a part of the non-pneumatic tire. FIG. 3 is an enlarged view of a part of FIG. 1. Here, reference symbol O denotes an axis, and reference symbol h denotes a cross-sectional height of the tire.

The non-pneumatic tire T is provided with a support-structure SS for supporting a load from a vehicle. The non-pneumatic tire T of the present invention just needs to be provided with such a support structure SS as described above. A member corresponding to the tread, a reinforcing layer, members for accommodation to an axle and a rim may be provided on an outer side (outer circumference side) and inner side (inner circumference side) of the support structure SS.

As shown in the front view of FIG. 1, in the non-pneumatic tire T of this embodiment the support structure SS includes: an inner annular portion 1; an outer annular portion 2 provided concentrically on an outer side of the inner annular portion 1; and a plurality of connecting portions 3 which connect the inner annular portion 1 and the outer annular portion 2 to each other and are provided independently of one another in a tire circumferential direction CD.

From a viewpoint of improving the uniformity, it is preferable that the inner annular portion 1 have a cylindrical shape with a constant thickness. Moreover, on an inner circumferential surface of the inner annular portion 1, it is preferable to provide irregularities and the like for maintaining fitting property in order to mount the non-pneumatic tire T to the axle and the rim.

The thickness of the inner annular portion 1 is preferably 2 to 7% of the cross-sectional height h of the tire, more preferably 3 to 6% thereof from a viewpoint of achieving weight reduction and improvement of durability while sufficiently transmitting force to the connecting portions 3.

An inner diameter of the inner annular portion 1 is appropriately determined according to dimensions of the rim and the axle on which the non-pneumatic tire T is to be mounted, and the like. However, when substitution for a general pneumatic tire is assumed, the inner diameter is preferably 250 to 500 mm, more preferably 330 to 440 mm.

A width of the inner annular portion 1 in a tire width direction is appropriately determined depending on a purpose, a length of the axle, and the like. However, when the substitution for a general pneumatic tire is assumed, the width is preferably 100 to 300 mm, more preferably 130 to 250 mm.

A tensile modulus of the inner annular portion 1 is preferably 5 to 180,000 MPa, more preferably 7 to 50,000 MPa from a viewpoint of achieving the weight reduction, the improvement of the durability and mounting easiness while sufficiently transmitting a force to the connecting portions 3. The tensile modulus in the present invention is a value calculated from a tensile stress at 10% elongation after conducting a tensile test according to JIS K7312.

The support structure SS in the present invention is formed of an elastic material. From a viewpoint of enabling integral molding at the time of manufacturing the support structure SS, it is preferable that the inner annular portion 1, the outer annular portion 2, and the connecting portion 3 be basically made of the same material except a reinforcing structure.

The elastic material in the present invention refers to a material in which the tensile modulus calculated from the tensile stress at 10% elongation after conducting the tensile test according to JIS K7312 is 100 MPa or less. In the elastic material of the present invention, the tensile modulus is preferably 5 to 100 MPa, more preferably 7 to 50 MPa from a viewpoint of imparting appropriate rigidity while obtaining sufficient durability. Examples of the elastic material used as a base material include thermoplastic elastomer, crosslinked rubber, and other resins.

Examples of the thermoplastic elastomer include polyester elastomer, polyolefin elastomer, polyamide elastomer, polystyrene elastomer, polyvinyl chloride elastomer, and polyurethane elastomer. Examples of a rubber material that composes the crosslinked rubber material include not only natural rubber but also synthetic rubber such as styrene butadiene rubber (SBR), butadiene rubber (BR), isoprene rubber (IIR), nitrite rubber (NBR), hydrogenated nitrile rubber (hydrogenated NBR), chloroprene rubber (CR), ethylene propylene rubber (EPDM), fluororubber, silicone rubber, acrylic rubber, and urethane rubber. Two or more of these rubber materials may be used in combination according to needs.

Examples of other resins include thermoplastic resin and thermosetting resin. Examples of the thermoplastic resin include polyethylene resin, polystyrene resin, and polyvinyl chloride resin. Examples of the thermosetting resin include epoxy resin, phenol resin, polyurethane resin, silicone resin, polyimide resin, and melamine resin.

Among the above elastic materials, the polyurethane resin is preferably used from viewpoints of moldability and processability and cost. As the elastic material, a foamed material may be used, and those obtained by foaming the above thermoplastic elastomer, crosslinked rubber, and other resins are usable.

In the support structure SS integrally molded with the elastic material, it is preferable that the inner annular portion 1, the outer annular portion 2, and the connecting portions 3 be reinforced by reinforcing fiber.

Examples of the reinforcing fiber include reinforcing fibers such as long fiber, short fiber, woven fabric, and nonwoven fabric. However, as a mode of using the long fiber, it is preferable to use net-like fiber aggregate composed of pieces of fiber, which are arrayed in the tire width direction, and of pieces of fiber, which are arrayed in the tire circumferential direction.

Examples of the reinforcing fiber include a rayon cord, a polyamide cord such as nylon-6,6, a polyester cord such as polyethylene terephthalate, an aramid cord, a glass fiber cord, a carbon fiber, and a steel cord.

In the present invention, in addition to the reinforcement using the reinforcing fiber, it is possible to perform reinforcement using a granular filler or reinforcement using a metal ring or the like. Examples of the granular filler include carbon black, silica, ceramics such as alumina, and other inorganic fillers.

From the viewpoint of improving the uniformity, it is preferable that the outer annular portion 2 have a cylindrical shape with a constant thickness. The thickness of the outer annular portion 2 is preferably 2 to 7% of the cross-sectional height h of the tire, more preferably 2 to 5% thereof from the viewpoint of achieving the weight reduction and the improvement of the durability while sufficiently transmitting force from the connecting portions 3.

An inner diameter of the outer annular portion 2 is appropriately determined depending on a purpose and the like. However, when the substitution for a general pneumatic tire is considered, the inner diameter is preferably 420 to 750 mm, more preferably 480 to 680 mm.

A width of the outer annular portion 2 in the tire width direction is appropriately determined depending on the purpose and the like. However, when the substitution for a general pneumatic tire is considered, the width is preferably 100 to 300 mm, more preferably 130 to 250 mm.

When a reinforcing layer 7 is provided on an outer circumference of the outer annular portion 2 as shown in FIG. 1, the tensile modulus of the outer annular portion 2 can be set to the same degree as the inner annular portion 1. When such a reinforcing layer 7 is not provided, the tensile modulus of the outer annular portion 2 is preferably 5 to 180,000 MPa, more preferably 7 to 50,000 MPa from a viewpoint of achieving the weight reduction and the improvement of the durability while sufficiently transmitting the force from the connecting portions 3.

When increasing the tensile modulus of the outer annular portion 2, a fiber-reinforced material in which an elastic material is reinforced by fiber and the like is preferably used. By reinforcing the outer annular portion 2 by reinforcing fiber, the outer annular portion 2 is also sufficiently adhered to a belt layer and the like.

The connecting portions 3 connect the inner annular portion 1 and the outer annular portion 2 to each other. The connecting portions 3 are plural and provided independently of one another in the tire circumferential direction CD at appropriate intervals between the inner annular portion 1 and the outer annular portion 2.

The plural connecting portions 3 are configured such that first connecting portions 31 and second connecting portions 32 are arrayed along the tire circumferential direction CD. In this case, it is preferable that the first connecting portions 31 and the second connecting portions 32 are arrayed alternately with each other along the tire circumferential direction CD. This makes it possible to further reduce the dispersion of the ground contact pressure during the tire rolling.

From the viewpoint of improving the uniformity, it is preferable that a pitch p in the tire circumferential direction CD between each of the first connecting portions 31 and each of the second connecting portions 32 be set constant. The pitch p is preferably 0 to 10 mm, more preferably 0 to 5 mm. When the pitch p is larger than 10 mm, the ground contact pressure becomes uneven, which may cause noise to increase.

Each of the first connecting portions 31 is extended from one side WD1 in the tire width direction of the inner annular portion 1 toward other side WD2 in the tire width direction of the outer annular portion 2. Meanwhile, each of the second connecting portions 32 is extended from the other side WD2 in the tire width direction of the inner annular portion 1 toward one side WD1 in the tire width direction of the outer annular portion 2. That is, the first connecting portion 31 and the second connecting portion 32, which are adjacent to each other, are disposed in a substantially X shape when viewed in the tire circumferential direction CD.

Figure 2:
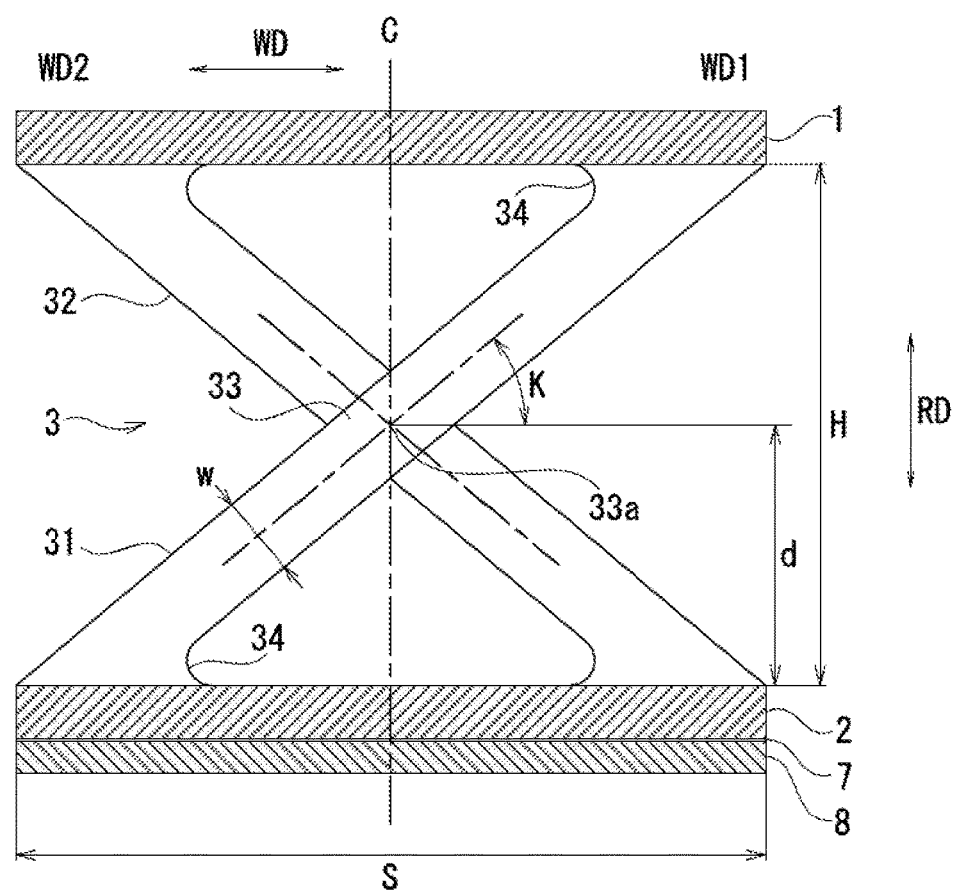
FIG. 2 is a cross-sectional view; taken along a line A-A of the non-pneumatic tire of FIG. 1.
Figure 3:
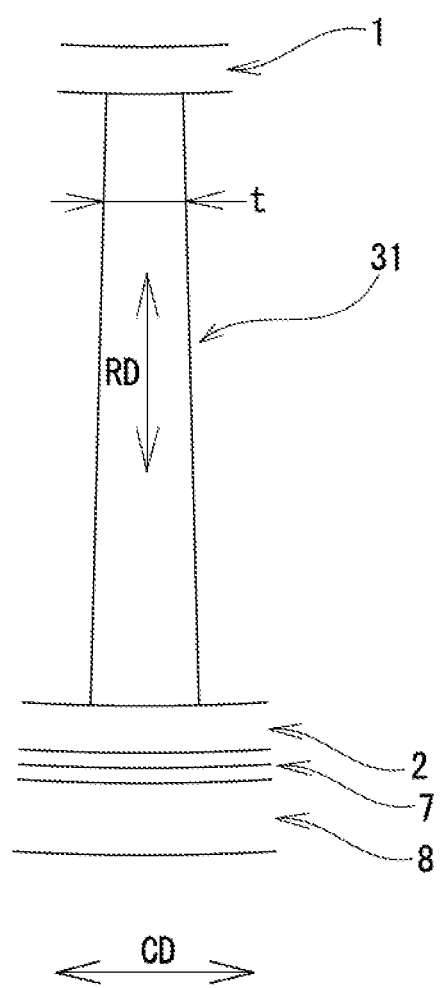
FIG. 3 is a partially enlarged view of the non-pneumatic tire of FIG. 1.

The first connecting portion 31 and the second connecting portion 32 when viewed in the tire circumferential direction CD are preferably symmetric to each other with respect to a tire equatorial plane C as shown in FIG. 2. Therefore, hereinafter, the first connecting portion 31 will mainly be described.

The first connecting portion 31 has an elongated plate-like shape extending from the inner annular portion 1 to the outer annular portion 2. In the first connecting portion 31, a plate thickness t is smaller than a plate width w, and a plate thickness direction is oriented to the tire circumferential direction CD. That is, the first-connecting portion 31 has a plate shape extending in a tire radial direction RD and in a tire width direction WD. The first connecting portion 31 and the second connecting portion 32 are formed into such an elongated plate shape. In this way, even if the plate thickness t is reduced, the first connecting portion 31 and the second connecting portion 32 can obtain desired rigidity by setting the plate width w to be wide. Therefore, the durability can be improved. Moreover, the number of first connecting portions 31 and the number of second connecting portions 32 are increased while thinning the plate thickness t. In this way, gaps between the connecting portions adjacent to one another in the tire circumferential direction CD can be reduced while maintaining the rigidity of the entire tire. Therefore, the dispersion of the ground contact pressure during the tire rolling can be reduced.

S is defined to be a length in the tire width direction WD of the first connecting portion 31, and H is defined to be a height in the tire radial direction RD thereof. In this embodiment, the length S in the tire width direction WD of the first connecting portion 31 is equal to the width in the tire width direction WD of each of the inner annular portion 1 and the outer annular portion 2. Moreover, the height H in the tire radial direction RD of the first connecting portion 31 is equal to a difference between a radius of an inner circumferential surface of the outer annular portion 2 and a radius of an outer circumferential surface of the inner annular portion 1. This difference can also be defined as a half of a difference between an inner diameter of the outer annular portion 2 and an outer diameter of the inner annular portion 1. Here, H/S is defined to be an aspect ratio of the non-pneumatic tire T.

Each of the first connecting portion 31 and the second connecting portion 32 when viewed from the tire circumferential direction CD extends linearly with a fixed width w from the inner annular portion 1 to the outer annular portion 2. When viewed from the tire circumferential direction CD, the first connecting portion 31 and the second connecting portion 32 intersect each other at a position of centers thereof in the extended directions. An inclination angle K of a centerline with respect to the tire width direction WD, the centerline passing through a center of a plate width w of the first connecting portion 31 in such an intersecting portion 33, satisfies a relationship of the following Expression (1).

$$30° \times (H/S)^{0.7} \leq K \leq 75° \times (H/S)^{0.7} \quad (1)$$

The aspect ratio H/S and the inclination angle K satisfy the relationship of Expression (1), whereby it is possible to improve both of the durability and the riding comfort.

An intersection 33a of the centerline of the plate-width w of the first connecting portion 31 and a centerline of a plate width of the second connecting portion 32 in the intersecting portion 33 is located at a position in a range of 30 to 70% of the height H from the inner circumferential surface of the outer annular portion 2 toward an inside in the tire radial direction. In other words, a height d in the tire radial direction from the inner circumferential surface of the outer annular portion 2 to the intersection 33a is 30 to 70% of the height H in the tire radial direction RD of the first connecting portion 31 and the second connecting portion 32. If the height d stays within this range, then it is possible to improve both of the durability and the riding comfort.

The plate thickness t is preferably from 8 to 30 mm, more preferably from 10 to 20 mm from the viewpoint of achieving the weight reduction and the improvement of the durability while sufficiently transmitting forces from the inner annular portion 1 and the outer annular portion 2.

The plate width w is preferably from 5 to 25 mm, more preferably from 10 to 20 mm from the viewpoint of achieving the weight reduction and the improvement of the durability while sufficiently transmitting the forces from the inner annular portion 1 and the outer annular portion 2. Moreover, the plate width w is preferably 110% or more of the plate thickness t, more preferably 115% or more thereof from a viewpoint of reducing the dispersion of the ground contact pressure while improving the durability.

Preferably, the first connecting portion 31 has reinforcing portions 34, in which a plate width gradually increases toward the inner annular portion 1 or the outer annular portion 2, in a vicinity of a joint portion with the inner annular portion 1 and in a vicinity of a joint portion with the outer annular portion 2. The reinforcing portions 34 are provided in insides in the tire width direction WD of the first connecting portion 31, in each of which an angle made by the first connecting portion 31 and the inner annular portion 1 or the outer annular portion 2 becomes an acute angle. In this way, the durability of the first connecting portion 31 can be further improved.

The number of the connecting portions 3 is preferably 80 to 300, more preferably 100 to 200 from a viewpoint of achieving the weight reduction, improvement of power transmission and the durability while sufficiently supporting the load from the vehicle. FIG. 1 shows an example in which 50 pieces of the first connecting portions 31 and 50 pieces of the second connecting portions 32 are provided.

A tensile modulus of the connecting portion 3 is preferably 5 to 180,000 MPa, more preferably 7 to 50,000 MPa from a viewpoint of achieving the weight reduction, the improvement of the durability and improvement of lateral rigidity while sufficiently transmitting the forces from the inner annular portion 1 and the outer annular portion 2. When increasing the tensile modulus of the connecting portion 3, a fiber-reinforced material in which an elastic material is reinforced by fiber and the like is preferably used.

In this embodiment, as shown in FIG. 1, there is shown an example in which the reinforcing layer 7 for making reinforcement against bending deformation of the outer annular portion 2 of the support structure SS is provided outside the outer annular portion 2. Moreover, in this embodiment, as shown in FIG. 1, an example in which a tread 8 is provided further outside the reinforcing layer 7 is shown. As the reinforcing layer 7 and the tread 8, it is possible to provide similar ones to a belt layer and a tread of the conventional pneumatic tire. The tread 8 may be made of resin. Further, as the tread pattern, it is possible to provide a similar pattern to the conventional pneumatic tire.

In the present invention, it is preferable to further dispose a width direction reinforcing layer for increasing the rigidity in the tire width direction between the tire radial direction outer end of the connecting portion 3 and the tread 8. This suppresses buckling at a tire width direction center portion of the outer annular portion 2 and makes it possible to further improve the durability of the connecting portions 3. The width direction reinforcing layer is buried in the outer annular portion 2 or disposed outside the outer annular portion 2. Examples of the width direction reinforcing layer include a stuff in which steel cords or cords made of fiber reinforced plastics such as carbon fiber reinforced plastics (CFRP) and glass fiber reinforced plastics (GFRP) are arrayed substantially parallel to the tire width direction, a cylindrical metal ring, and a cylindrical high-modulus resin ring.

Figure 4A:
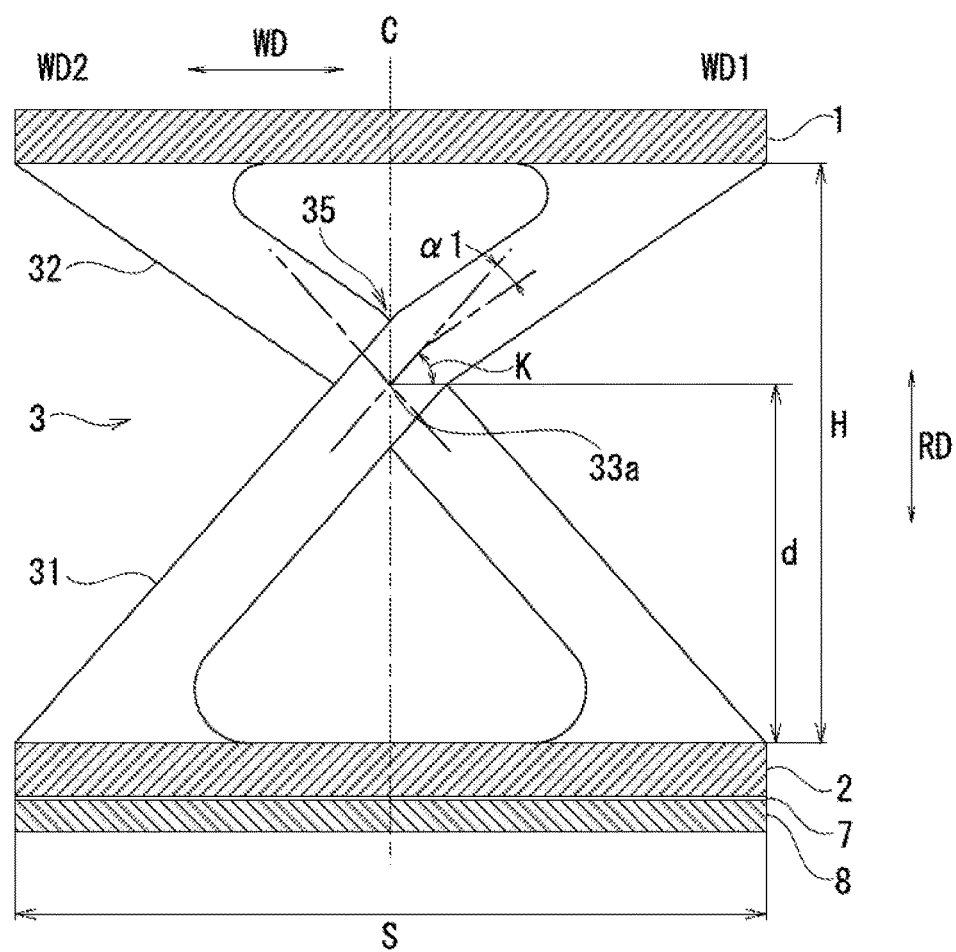
FIG. 4A is a cross-sectional view of a non-pneumatic tire according to another embodiment.

Other Embodiments (1) In the above-mentioned embodiment, each of the first connecting portion 31 and the second connecting portion 32 when viewed from the tire circumferential direction CD extends linearly from the inner annular portion 1 to the outer annular portion 2. However, the present invention is not limited to this. As shown in FIG. 4A, at least either one of the first connecting portion 31 and the second connecting portion 32 when viewed from the tire circumferential direction CD may include a bent portion 35 in which there changes an inclination angle with respect to the tire width direction WD of the centerline of the plate width. An angle change $\alpha 1$ of the inclination angle with respect to the tire width direction WD in the bent portion 35 is preferably 45° or less, particularly preferably 35° or less. When the angle change $\alpha 1$ is larger than 45°, a stress is concentrated to the bent portion 35. Accordingly, it becomes difficult to improve both of the durability and the riding comfort.

Figure 4B:
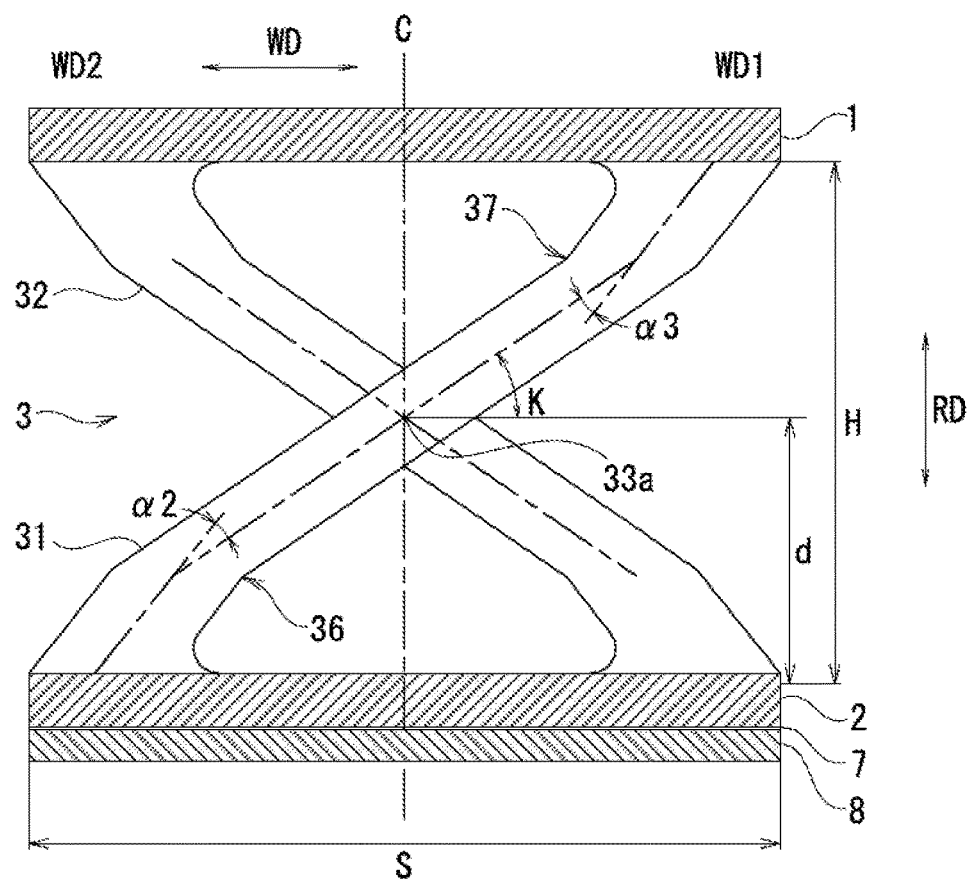
FIG. 4B is a cross-sectional view of a non-pneumatic tire according to another embodiment.

(2) Moreover, as shown in FIG. 4B, at least either one of the first connecting portion 31 and the second connecting portion 32 when viewed from the tire circumferential direction CD may include a first bent portion 36 and a second bent portion 37, in each of which there changes an inclination angle with respect to the tire width direction WD of the centerline of the plate width. An angle change $\alpha 2$ of the inclination angle in the first bent portion 36 and an angle change $\alpha 3$ of the inclination angle in the second bent portion 37 are preferably 45° or less, particularly preferably 35° or less. Moreover, a difference between the angle change $\alpha 2$ of the inclination angle in the first bent portion 36 and an angle change $\alpha 3$ of the inclination angle in the second bent portion 37 is preferably 30° or less. When the difference between the angle change α2 and the angle change α3 is larger than 30°, a stress is concentrated to the first bent, portion 36 or the second bent portion 37. Accordingly, it becomes difficult to improve both of the durability and the riding comfort.

Figure 4C:
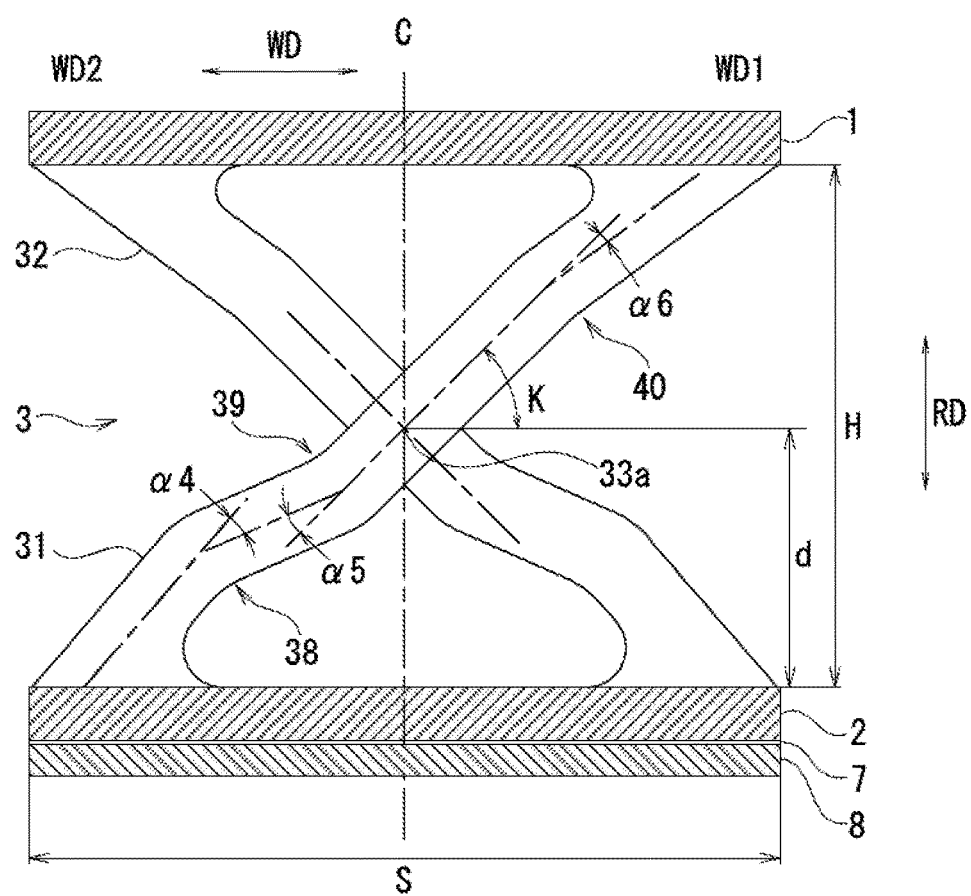
FIG. 4C is a cross-sectional view of a non-pneumatic tire according to another embodiment.

(3) Moreover, at least either one of the first connecting portion 31 and the second connecting portion 32 when viewed from the tire circumferential direction CD may include three or more bent portions. In an example shown in FIG. 4C, each of the first connecting portion 31 and the second connecting portion 32 includes three bent portions 38 to 40. An angle change α4 of the inclination angle in the bent portion 38, an angle change α5 of the inclination angle in the bent portion 39 and an angle change α6 of the inclination angle in the bent portion 40 are preferably 45° or less, particularly preferably 35° or less. Moreover, differences between the angle change α4, the angle change α5 and the angle change α6 are preferably 30° or less.

EXAMPLES

Examples and the like which specifically show the configuration and effect of the present invention will be described below. Evaluation items in Examples and the like were measured as follows.

(1) Durability

The durability was measured as follows by a drum testing machine in accordance with FMVSS 109. A test speed was set constant at 80 km/h, and a distance traveled until a failure occurred was measured while applying a load divided into four gradually increasing steps. The distance traveled is indicated by an index when a distance traveled in Comparative example 1 is 100, and a larger value exhibits superior durability.

(2) Riding Comfort

Sensory evaluation was carried out comprehensively about a riding comfort in a test course when two people ride. The riding comfort is indicated as a degree of strength of pushing up and down in the vertical direction, the pushing being directly felt by an occupant through his/her body. It is evaluated that stronger pushing exhibits a worse riding comfort. The riding comfort is indicated by an index when a riding comfort in Comparative example 1 is 100, and a larger value exhibits a superior riding comfort.

Examples 1 to 6 and Comparative Examples 1 to 6

The non-pneumatic tires in the modes shown in FIG. 2, FIG. 4A, FIG. 4B and FIG. 4C were defined to be those in Examples 1 to 6 and Comparative examples 1 to 6. With regard to the first connecting portion 31 and the second connecting portion 32, values shown in Table 1 and Table 2 were used for the length S in the tire width direction, the height H in the tire radial direction, the inclination angle K, the height d to the intersection 33a and the angle changes to α1 to α6. Comparative examples 1 to 6 are non-pneumatic tires in the modes corresponding to those of Examples 1 to 6; however, do not have H/S and K which satisfy the relationship of Expression (1).

TABLE 1

|  | Example 1 | Example 2 | Example 3 | Example 4 | Example 5 | Example 6 |
| --- | --- | --- | --- | --- | --- | --- |
| Length S in tire width direction (mm) | 140 | 100 | 180 | 140 | 140 | 140 |
| Height H in tire radial direction (mm) | 100 | 50 | 70 | 100 | 100 | 100 |
| Inclination angle K (°) | 55 | 45 | 20 | 25 | 40 | 40 |
| Height d to intersection (mm) | 50 | 35 | 25 | 70 | 40 | 60 |
| α1(°) | — | — | 45 | 35 | — | — |
| α2(°) | — | — | — | — | 35 | — |
| α3(°) | — | — | — | — | 5 | — |
| α4(°) | — | — | — | — | — | 35 |
| α5(°) | — | — | — | — | — | 20 |
| α6(°) | — | — | — | — | — | 5 |
| Durability | 102 | 105 | 100 | 101 | 100 | 102 |
| Riding comfort | 100 | 100 | 105 | 105 | 110 | 110 |

TABLE 2

|  | Comparative example 1 | Comparative example 2 | Comparative example 3 | Comparative example 4 | Comparative example 5 | Comparative example 6 |
| --- | --- | --- | --- | --- | --- | --- |
| Length S in tire width direction (mm) | 140 | 100 | 180 | 140 | 140 | 140 |
| Height H in tire radial direction (mm) | 100 | 50 | 70 | 100 | 100 | 100 |
| Inclination angle K (°) | 60 | 50 | 10 | 20 | 60 | 60 |
| Height d to intersection (mm) | 50 | 25 | 25 | 80 | 20 | 50 |

TABLE 2-continued

|  | Comparative example 1 | Comparative example 2 | Comparative example 3 | Comparative example 4 | Comparative example 5 | Comparative example 6 |
|---|---|---|---|---|---|---|
| α1(°) | — | — | 60 | 50 | — | — |
| α2(°) | — | — | — | — | 40 | — |
| α3(°) | — | — | — | — | 5 | — |
| α4(°) | — | — | — | — | — | 40 |
| α5(°) | — | — | — | — | — | 25 |
| α6(°) | — | — | — | — | — | 5 |
| Durability | 100 | 94 | 89 | 91 | 92 | 94 |
| Riding comfort | 100 | 105 | 105 | 110 | 110 | 110 |

As seen from the results in Table 1, Examples 1 to 6 in which H/S and K satisfied the relationship of Expression (1) were able to improve both of the durability and the riding comfort.

What is claimed is:

1. A non-pneumatic tire comprising a support structure for supporting a load from a vehicle, wherein
    the support structure includes an inner annular portion, an outer annular portion concentrically provided on an outer side of the inner annular portion, and a plurality of connecting portions which connect the inner annular portion and the outer annular portion to each other and are provided in a tire circumferential direction independently of one another,
    the plurality of connecting portions is configured such that elongated plate-like first connecting portions and elongated plate-like second connecting portions are arrayed along the tire circumferential direction, the first connecting portions being extended from one side in a tire width direction of the inner annular portion to another side in a tire width direction of the outer annular portion, and the second connecting portions being extended from another side in the tire width direction of the inner annular portion to one side in the tire width direction of the outer annular portion,
    in each of the first connecting portions and the second connecting portions, a plate thickness is smaller than a plate width, and a plate thickness direction is oriented to the tire circumferential direction,
    with S being a length in the tire width direction and H being a height in a tire radial direction for each of the first connecting portions and the second connecting portions, an inclination angle K of a centerline of the plate width of each of the first connecting portions and the second connecting portions with respect to the tire width direction in an intersecting portion of each of the first connecting portions and each of the second connecting portions when viewed from the tire circumferential direction satisfies a relationship of a following Expression (1):

$$30 \times (H/S)^{0.7} \leq K \leq 75 \times (H/S)^{0.7} \quad (1),$$

at least either one of the first connecting portion and the second connecting portion when viewed from the tire circumferential direction includes a first bent portion in which an inclination angle of the centerline of the plate width with respect to the tire width direction changes,
    an angle change of the inclination angle at the first bent portion is 45° or less,
    the at least either one of the first connecting portion and the second connecting portion when viewed from the tire circumferential direction further includes a second bent portion in which the inclination angle of the centerline of the plate width with respect to the tire width direction changes, and
    a difference between the angle change of the inclination angle in the first bent portion and an angle change of the inclination angle in the second bent portion is 30° or less.

2. The non-pneumatic tire according to claim 1, wherein an intersection of the centerlines of the plate widths of the first connecting portion and the second connecting portion in the intersecting portion is located at a position in a range of 30 to 70% of the height H in the tire radial direction from an inner circumferential surface of the outer annular portion toward an inside in the tire radial direction.

3. The non-pneumatic tire according to claim 1, wherein the angle change of the inclination angle in the second bent portion is 45° or less.

* * * * *